(12) United States Patent
Isai et al.

(10) Patent No.: US 12,548,764 B2
(45) Date of Patent: Feb. 10, 2026

(54) POSITIVE ELECTRODE ACTIVE MATERIAL AND POSITIVE ELECTRODE FOR NONAQUEOUS ELECTROLYTE SECONDARY BATTERY

(71) Applicant: NICHIA CORPORATION, Anan (JP)

(72) Inventors: Kento Isai, Anan (JP); Kenichi Kobayashi, Tokushima (JP); Kiyoto Ikebata, Tokushima (JP); Koichi Sumiwaka, Anan (JP); Hayato Ishibashi, Anan (JP)

(73) Assignee: NICHIA CORPORATION, Anan (JP)

( * ) Notice: Subject to any disclaimer, the term of this patent is extended or adjusted under 35 U.S.C. 154(b) by 559 days.

(21) Appl. No.: 18/043,014

(22) PCT Filed: Aug. 24, 2021

(86) PCT No.: PCT/JP2021/030973
§ 371 (c)(1),
(2) Date: Feb. 24, 2023

(87) PCT Pub. No.: WO2022/045125
PCT Pub. Date: Mar. 3, 2022

(65) Prior Publication Data
US 2023/0327079 A1  Oct. 12, 2023

(30) Foreign Application Priority Data

Aug. 25, 2020 (JP) .................... 2020-141364

(51) Int. Cl.
*H01M 10/0525* (2010.01)
*H01M 4/131* (2010.01)
(Continued)

(52) U.S. Cl.
CPC .......... *H01M 4/364* (2013.01); *H01M 4/485* (2013.01); *H01M 4/505* (2013.01); *H01M 4/525* (2013.01);
(Continued)

(58) Field of Classification Search
CPC .. H01M 10/0525; H01M 4/131; H01M 4/364; H01M 4/485; H01M 4/505; H01M 4/525
See application file for complete search history.

(56) References Cited

U.S. PATENT DOCUMENTS

2011/0129734 A1  6/2011  Konishi et al.
2013/0302685 A1  11/2013  Kim et al.
(Continued)

FOREIGN PATENT DOCUMENTS

JP   H11162466 A   6/1999
JP   2002075367 A   3/2002
(Continued)

*Primary Examiner* — Kevin E Yoon
(74) *Attorney, Agent, or Firm* — Hunton Andrews Kurth LLP

(57) ABSTRACT

Provided is a positive electrode active material which inhibits a decrease in discharge capacity while improving output in a low SOC region. The positive electrode active material includes: first particles that each consist of a first lithium transition metal composite oxide, the first lithium transition metal composite oxide having a layered structure and having a ratio of a number of moles of nickel to a total number of moles of metals other than lithium in a composition thereof being 0.7 or greater and smaller than 1; second particles that have a volume average particle diameter smaller than a volume average particle diameter of the first particles, the second particles each consisting of a second lithium transition metal composite oxide having a layered structure; and third particles that each consist of a third lithium transition metal composite oxide, the third lithium transition metal composite oxide having a layered structure, having a ratio of (Continued)

number of moles of nickel to total number of moles of metals other than lithium in a composition thereof being 0.4 to 0.6, and having a ratio of a number of moles of cobalt to the total number of moles being 0.35 to 0.55. The first particle content is 60 mass % or higher and lower than 100 mass %, and the third particle content is 10 mass % or lower, to a total content of the first particles, the second particles, and the third particles.

17 Claims, 3 Drawing Sheets

(51) Int. Cl.
    *H01M 4/36*       (2006.01)
    *H01M 4/485*     (2010.01)
    *H01M 4/505*     (2010.01)
    *H01M 4/525*     (2010.01)
    *H01M 4/02*       (2006.01)

(52) U.S. Cl.
    CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2014/0038052 A1 | 2/2014 | Song et al. |
| 2014/0342230 A1* | 11/2014 | Watanabe ............. H01M 4/505 |
| | | 429/223 |
| 2016/0056463 A1 | 2/2016 | Tsuji et al. |
| 2017/0373352 A1 | 12/2017 | Saka et al. |
| 2018/0241036 A1 | 8/2018 | Jo et al. |
| 2018/0287202 A1 | 10/2018 | Matsushita et al. |
| 2019/0190018 A1 | 6/2019 | Aoki et al. |
| 2019/0341598 A1 | 11/2019 | Nam et al. |
| 2020/0091515 A1 | 3/2020 | Takezawa et al. |
| 2020/0185714 A1 | 6/2020 | Han et al. |
| 2020/0266438 A1 | 8/2020 | Han et al. |
| 2020/0335783 A1 | 10/2020 | Lee et al. |
| 2021/0265627 A1 | 8/2021 | Hiratsuka |
| 2022/0029158 A1 | 1/2022 | Takamori |

FOREIGN PATENT DOCUMENTS

| | | |
|---|---|---|
| JP | 2006012433 A | 1/2006 |
| JP | 2011113825 A | 6/2011 |
| JP | 2011146132 A | 7/2011 |
| JP | 2011146390 A | 7/2011 |
| JP | 2017016794 A | 1/2017 |
| JP | 2017228466 A | 12/2017 |
| JP | 2018536253 A | 12/2018 |
| JP | 2019029205 A | 2/2019 |
| JP | 2020514972 A | 5/2020 |
| JP | 2020083750 A | 6/2020 |
| JP | 2020087879 A | 6/2020 |
| WO | 2014156011 A1 | 10/2014 |
| WO | 2017057078 A1 | 4/2017 |
| WO | 2017098714 A1 | 6/2017 |
| WO | 2018043190 A1 | 3/2018 |
| WO | 2018221024 A1 | 12/2018 |
| WO | 2020003642 A1 | 1/2020 |

* cited by examiner

POSITIVE ELECTRODE ACTIVE MATERIAL AND POSITIVE ELECTRODE FOR NONAQUEOUS ELECTROLYTE SECONDARY BATTERY

CROSS-REFERENCE TO RELATED APPLICATIONS

This application is a national stage entry of International Application No. PCT/JP2021/030973, filed on Aug. 24, 2021, which claims priority to Japanese Patent Application No. 2020-141364, filed on Aug. 25, 2020, the disclosures of which are hereby incorporated by reference in their entireties.

TECHNICAL FIELD

The present disclosure relates to a positive electrode active material and a positive electrode for a nonaqueous electrolyte secondary battery.

BACKGROUND ART

A lithium-transition metal composite oxide such as lithium cobalt oxide, lithium nickelate, or nickel cobalt lithium manganate is used as a positive electrode active material for a nonaqueous electrolyte secondary battery. Various investigations have been made for improving the properties of the positive electrode active material, and it is known that a lithium-nickel-based composite oxide having an increased rate of nickel therein instead of cobalt that is a scarce resource has a high charge and discharge capacity per unit weight. On the other hand, WO2018/043190 describes that a nickel-containing lithium transition metal oxide has a DC resistance value that increases associated with an increase of the nickel content thereof. Japanese Laid-Open Patent Publication No. 2017-228466 describes that a lithium-nickel-cobalt-manganese composite oxide represented by $LiNi_{0.4}Co_{0.2}Mn_{0.4}O_2$ and a lithium-nickel-cobalt-manganese composite oxide represented by $LiNi_{0.4}Co_{0.5}Mn_{0.1}O_2$ are mixed with each other to thereby reduce the resistance in a low state of charge (SOC) region.

SUMMARY OF THE INVENTION

Problem to be Solved by the Invention

An object of an embodiment of the present disclosure is to provide a positive electrode active material and a positive electrode for a nonaqueous electrolyte secondary battery, that suppress reduction of the discharge capacity improving the output power in a low SOC region.

Means for Solving Problem

A first embodiment is a positive electrode active material including first particles that each consist of a first lithium transition metal composite oxide having a layered structure and having the ratio of the number of moles of nickel to the total number of moles of metals other than lithium in the composition thereof being 0.7 or greater and smaller than 1, second particles that have a volume average particle diameter smaller than the volume average particle diameter of the first particles and that each consist of a second lithium transition metal composite oxide having a layered structure, and third particles that each consist of a third lithium transition metal composite oxide having a layered structure and having a ratio of a number of moles of nickel to a total number of moles of the metals other than lithium in the composition thereof being 0.4 or greater and 0.6 or smaller and having a ratio of a number of moles of cobalt to the total number of moles being 0.35 or greater and 0.55 or smaller and, in the positive electrode active material, a content of the first particles is 60% by mass or higher and lower than 100% by mass to the total content of the first particles, the second particles, and the third particles, and a content of the third particles is 10% by mass or lower to the total content of the first particles, the second particles, and the third particles.

A second embodiment is a positive electrode for a nonaqueous electrolyte secondary battery. The positive electrode includes the positive electrode active material.

Effect of the Invention

According an embodiment of the present disclosure, a positive electrode active material and a positive electrode for a nonaqueous electrolyte secondary battery in which the reduction of the discharge capacity is suppressed and the output power in the low SOC region is improved can be provided.

MODES FOR CARRYING OUT THE INVENTION

Figure 1:
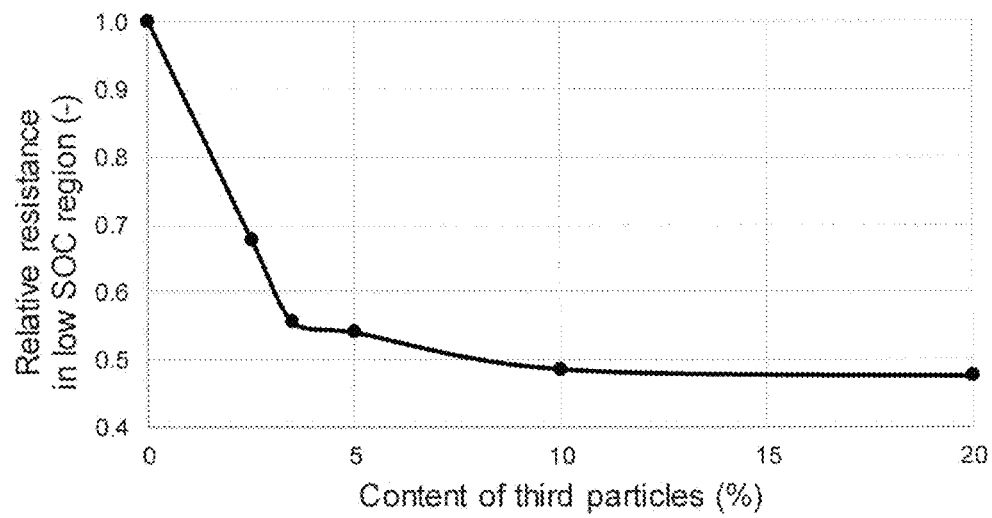
FIG. 1 is a diagram plotting the result of measurement of the DC internal resistance in a low SOC region of each of Examples and Comparative Examples.

In the present specification, as far as not especially mentioned, in the case where plural materials corresponding to each component are present in a composition, the content of the component in the composition means the total amount of the plural materials present in the composition. For an upper limit and a lower limit of a numerical value range described herein, values exemplified as the numerical value range may optionally be selected to be combined. An embodiment of the present disclosure will be described below in detail. The embodiment described below however only exemplifies a positive electrode active material for embodying the technical idea of the present disclosure, and the present disclosure is not limited to the positive electrode active material described below.

Positive Electrode Active Material

The positive electrode active material includes first particles that each consist of a first lithium transition metal composite oxide having a layered structure and having the ratio of the number of moles of nickel to the total number of moles of metals other than lithium in the composition thereof being 0.7 or greater and smaller than 1, second particles that have a volume average particle diameter smaller than the volume average particle diameter of the first particles and that each consist of a second lithium transition metal composite oxide having a layered structure, and third particles that each consist of a third lithium transition metal composite oxide having a layered structure, having the ratio of the number of moles of nickel to the total number of moles of the metals other than lithium in the composition thereof being 0.4 or greater and 0.6 or smaller, and having the ratio of the number of moles of cobalt to the total number of moles of the metals other than lithium being 0.35 or greater and 0.55 or smaller. The content of the first particles is 60% by mass or higher and lower than 100% by mass to the total content of the first particles, the second particles, and the third particles. The content of the third particles is 10% by mass or lower to the total content of the first particles, the second particles, and the third particles.

When the third particles are mixed intending to improve the output power in the low SOC region of the positive electrode active material that includes the first particles, reduction of the charge and discharge capacity occurring associated with the mixing of the third particles is concerned. On the other hand, in the case where the mixing amount of the third particles is reduced to address the reduction of the charge and discharge capacity, the content of the first particles having a low insertion rate of lithium ions in the low SOC region is increased. Therefore, the effect of improving the output power in the low SOC region tends to be difficult to be achieved even though the third particles are mixed therein. At this time, it may be considered that, by further adding the second particles whose volume average particle diameter is smaller than that of the first particles, the second particles that are smaller than the first particle play the role of assisting the move of the lithium ions between the first particles and the third particles in the low SOC region. In the case where the above positive electrode active material is used in a positive electrode for a nonaqueous electrolyte secondary battery, diffusion of the lithium ions in the overall positive electrode may be promoted. The output power in the low SOC region thereby tends to be improved suppressing the reduction of the charge and discharge capacity.

The content of the first particles included in the positive electrode active material to the total content of the first particles, the second particles, and the third particles is 60% by mass or higher and lower than 100% by mass, is preferably 65% by mass or higher and 95% by mass or lower, is more preferably 70% by mass or higher and 90% by mass or lower, and is further preferably 75% by mass or higher and 85% by mass or lower. In the case where the content of the first particles is in the above ranges, the charge and discharge capacity become good and the output power in the low SOC region tends to be able to be improved.

The content of the second particles included in the positive electrode active material to the total content of the first particles, the second particles, and the third particles may be 1% by mass or higher and lower than 30% by mass, and is preferably 2% by mass or higher and 20% by mass or lower, is more preferably 5% by mass or higher and 20% by mass or lower, and is further preferably 8% by mass or higher and 20% by mass or lower, and 12% by mass or higher and 19% by mass or lower. In the case where the content of the second particles is in the above ranges, the output power in the low SOC region can more efficiently be improved suppressing the reduction of the charge and discharge capacity.

The content of the third particles included in the positive electrode active material to the total content of the first particles, the second particles, and the third particles is 10% by mass or lower, and is preferably higher than 0% by mass and lower than 10% by mass, is more preferably 1% by mass or higher and 8% by mass or lower, and is further preferably 2% by mass or higher and 6% by mass or lower. In the case where the ratio of the number of moles of nickel to the total number of moles of the metals other than lithium in the composition of the first particles is 0.7 or greater and smaller than 1 as described in the present disclosure, the output power in the low SOC region may more efficiently be improved suppressing the reduction of the charge and discharge capacity when the content of the third particles is in the above ranges.

The content of the second particles to the content of the third particles, as the mass ratio, is preferably a 1-fold amount or more and a 25-fold amount or less, is more preferably a 1.2-fold amount or more and a 15-fold amount or less, is further preferably a 1.5-fold amount or more and a 10-fold amount or less, and is especially preferably a 2-fold amount or more and a 9-fold amount or less. The output power in the low SOC region tends to be easily improved when the content of the second particles to the content of the third particles is in the above ranges.

The content of the first particles to the content of the third particles, as the mass ratio, is preferably a 5-fold amount or more and a 80-fold amount or less, is more preferably a 6-fold amount or more and a 50-fold amount or less, and is further preferably a 10-fold amount or more and a 36-fold amount or less. The charge and discharge capacity tends to be better when the content of the first particles to the content of the third particles is in the above ranges.

The content of the first particles to the content of the second particles, as the mass ratio, is preferably a 2-fold amount or more and a 15-fold amount or less, is more preferably a 2.5-fold amount or more and a 12-fold amount or less, is further preferably a 3.6-fold amount or more and a 12-fold amount or less, and is especially preferably a 4-fold amount or more and a 6-fold amount or less. The output power in the low SOC region tends to be more easily improved when the content of the first particles to the content of the second particles is in the above ranges.

First Particles

The first particles each include a first lithium transition metal composite oxide that has a layered structure. The first particles may each be a secondary particle formed by aggregated plural primary particles each including the first lithium transition metal composite oxide.

As to the first lithium transition metal composite oxide included in the first particles, the ratio of the number of moles of nickel to the total number of moles of the metals other than lithium in the composition thereof is 0.7 or greater and smaller than 1, and is preferably 0.7 or greater and 0.95 or smaller, and is more preferably 0.8 or greater and 0.95 or smaller. The positive electrode active material particles including the first lithium transition metal composite oxide whose ratio of the number of moles of nickel is in the above ranges tends to have a more increased charge and discharge capacity. When the ratio of the number of moles of nickel is in the above ranges, the effect of improving the output power in the low SOC region of the present disclosure tends to be easily acquired even with the mixing amount of the third particles that is in a range of 10% by mass or less. When the ratio of the number of moles of nickel is in the above ranges, the reduction of the charge and discharge capacity is more suppressed at the time when the output power improvement in the low SOC region of the present disclosure is achieved. The composition of the lithium transition metal composite oxide may be measured by, for example, an inductively coupled plasma emission spectrometer.

The first lithium transition metal composite oxide included in the first particles may contain cobalt in the composition thereof. In the case where the first lithium transition metal composite oxide included in the first particles contains cobalt in the composition thereof, the ratio of the number of moles of cobalt to the total number of moles of the metals other than lithium is, for example, greater than 0 and 0.3 or smaller, is preferably 0.02 or greater and 0.2 or smaller, and is more preferably 0.02 or greater and 0.1 or smaller. The first lithium transition metal composite oxide included in the first particles may contain at least one of manganese and aluminum. In the case where the first lithium transition metal composite oxide contains at least one of manganese and aluminum, the ratio of the total number of moles of manganese and aluminum to the total number of moles of the metals other than lithium is, for example, greater than 0, is preferably 0.01 or greater, is more preferably 0.05 or greater, and is further preferably 0.07 or greater. The ratio of the total number of moles of manganese and aluminum to the total number of moles of the metal elements other than lithium is, for example, 0.3 or smaller, is preferably 0.25 or smaller, is more preferably 0.2 or smaller, and is further preferably 0.15 or smaller. When the ratio of the total number of moles of manganese and aluminum is in the above ranges, the safety tends to be improved maintaining a good charge and discharge capacity.

The ratio of the number of moles of lithium to the total number of moles of the metals other than lithium in the first lithium transition metal composite oxide included in the first particles is, for example, 0.95 or greater, is preferably 1.0 or greater, is more preferably 1.03 or greater, and is further preferably 1.05 or greater. The ratio of the number of moles of lithium to the total number of moles of the metals other than lithium is, for example, 1.5 or smaller, is preferably 1.3 or smaller, is more preferably 1.25 or smaller, and is further preferably 1.2 or greater. When the ratio of the number of moles of lithium is 0.95 or greater, the output power tends to be improved of a nonaqueous electrolyte secondary battery that uses the positive electrode active material including the first lithium transition metal composite oxide. On the other hand, when the ratio of the number of moles of lithium is 1.5 or smaller, the initial discharge capacity tends to be improved in the case where the positive electrode active material is used in a positive electrode.

The first lithium transition metal composite oxide may contain, in the composition thereof, an element $M^2$ that includes at least one selected from the group consisting of magnesium (Mg), calcium (Ca), titanium (Ti), zirconium (Zr), niobium (Nb), tantalum (Ta), chromium (Cr), molybdenum (Mo), tungsten (W), iron (Fe), copper (Cu), silicon (Si), tin (Sn), bismuth (Bi), gallium (Ga), yttrium (Y), samarium (Sm), erbium (Er), cerium (Ce), neodymium (Nd), lanthanum (La), cadmium (Cd), and lutetium (Lu), and may contain preferably the element $M^2$ that includes at least one selected from the group consisting of Zr, Ti, Mg, Ta, Nb, Mo, and W.

The ratio of the number of moles of the element $M^2$ to the total number of moles of the metals other than lithium in the first lithium transition metal composite oxide may be, for example, 0 or greater and 0.02 or smaller, and may be preferably 0.015 or smaller.

Examples of the first lithium transition metal composite oxide included in each of the first particles, presented as the compositions thereof, include, for example, a lithium transition metal composite oxide represented by Formula (1) below. The first lithium transition metal composite oxide may have a layered structure and may also be the one that has a crystal structure of a hexagonal system.

$$Li_{p1}Ni_{x1}Co_{y1}M^1_{z1}M^2_{w1}O_{\alpha 1} \qquad (1)$$

p1, x1, y1, z1, w1, and α1 satisfy 0.95≤p1≤1.5, 0.7≤x1<1, 0<y1≤0.3, 0<z1≤0.3, 0≤w1≤0.02, x1+y1+z1+w1=1, and 1.5≤α1≤2.5. x1, y1, z1, and w1 may satisfy 0.7≤x1≤0.95, 0.02≤y1≤0.2, 0.01≤z1≤0.25, and 0≤w1≤0.015, may satisfy 0.8≤x1≤0.95, 0.02≤y1≤0.2, 0.05≤z1≤0.2, and 0≤w1≤0.015, and may satisfy 0.8≤x1≤0.95, 0.02≤y1≤0.1, 0.07≤z1≤0.15, and 0≤w1≤0.015. p1 may satisfy 1.0≤p1, 1.03≤p1, or 1.05≤p1, may satisfy p1≤1.3, p1≤1.25, or p1≤1.2, and α1 may satisfy 1.8≤α1≤2.8.

$M^1$ may include at least one of Mn and Al. $M^2$ may include at least one selected from the group consisting of Mg, Ca, Ti, Zr, Nb, Ta, Cr, Mo, W, Fe, Cu, Si, Sn, Bi, Ga, Y, Sm, Er, Ce, Nd, La, Cd, and Lu, and may include at least one selected from the group consisting of Zr, Ti, Mg, Ta, Nb, Mo, and W.

The volume average particle diameter of the first particles is, for example, 6 μm or larger and 30 μm or smaller, is preferably 7 μm or larger, is more preferably 8 μm or larger, and is preferably 25 μm or smaller, and is more preferably 20 μm or smaller. When the volume average particle diameter of the first particles is in the above ranges, the fillability may be improved in the case where other particles are mixed therewith, and the battery properties may further be improved. The volume average particle diameter is a 50%-particle diameter $D_{50}$ that corresponds to the accumulated 50% from the small diameter side in the accumulated particle size distribution based on the volume.

It is preferred that the first particles have a narrow particle size distribution with a single peak. As to the particle size distribution of the first particles, the ratio of the 90%-particle diameter $D_{90}$ corresponding to the accumulated 90% from the side of the small diameter to the 10%-particle diameter $D_{10}$ corresponding to the accumulated 10% from the side of the small diameter ($D_{90}/D_{10}$) in the accumulated particle size distribution based on the volume may be, for example, 3 or smaller, may be preferably 2.5 or smaller, 2 or smaller, 1.8 or smaller, 1.6 or smaller, or 1.5 or smaller. The lower limit of the ratio ($D_{90}/D_{10}$) of the first particles may be, for example, 1 or greater, or 1.1 or greater.

The first particles may include compounds other than the first lithium transition metal composite oxide, such as a compound including sodium and a compound including boron. The content of the compounds other than the first lithium transition metal composite oxide to the first lithium transition metal composite oxide may be 0 ppm or more and 12,000 ppm or less, may be 0 ppm or more and 10,000 ppm or less, may be 0 ppm or more and 8,000 ppm or less, and may be 0 ppm or more and 6,000 ppm or less.

The first particles may each include a compound that includes boron, on the surface thereof. In the case where the first particles each having the compound that includes boron as an adhering substance thereto are used in the nonaqueous electrolyte secondary battery, the charge and discharge property and the cycle property tend to be improved.

Examples of the compound that includes boron include lithium metaborate ($LiBO_2$). The compound including boron may form a composite with the first lithium transition metal composite oxide. The content of the compound including boron in the first particles to the first lithium transition metal composite oxide in terms of boron element may be 0 ppm or more and 2,000 ppm or less, and 0 ppm or more and 1,500 ppm or less. The content of the compound including boron in the first particles may be, for example, 0.1% by mole or higher and 2% by mole or lower and is preferably 0.1% by mole or higher and 1.5% by moles or lower as the rate of the number of moles of the boron element to the total number of moles of the metals other than lithium of the first lithium transition metal composite oxide included in the first particles. The content of boron in the positive electrode active material can be measured by, for example, an inductively coupled plasma emission spectrometer.

The first particles may each include a compound that includes sodium, on the surface of the particle. Examples of the compound including sodium include sodium sulfate ($Na_2SO_4$). In the case where the first particles each have the sodium compound on the surface thereof, an effect achieved by the adhering substances such as the compound including boron tends to be more improved. In the case where the first particles each include, for example, the compound including boron as the adhering substance, a better cycle property can be achieved by applying the first particles to a nonaqueous electrolyte secondary battery. In the case where the first particles are each a secondary particle formed by aggregated plural primary particles each including the first lithium transition metal composite oxide, it may be considered that sodium is present on the grain boundary of each of the secondary particles each including the first lithium transition metal composite oxide included in each of the first particles, boron may thereby evenly distribute on the overall grain boundary of each of the first particles, and an better cycle property may therefore be acquired.

Second Particles

The second particles each include a second lithium transition metal composite oxide that has a layered structure, and have a volume average particle diameter that is smaller than that of the first particles. The second particles may each be a secondary particle formed by aggregated plural primary particles each including the second lithium transition metal composite oxide.

As to the second lithium transition metal composite oxide included in each of the second particles, the ratio of the number of moles of nickel to the total number of moles of the metals other than lithium in the composition thereof may be 0.33 or greater and smaller than 1, is preferably 0.7 or greater and smaller than 1, is more preferably 0.7 or greater and 0.95 or smaller, and is further preferably 0.8 or greater and 0.95 or smaller. With the positive electrode active material particles each including the second lithium transition metal composite oxide whose ratio of the number of moles of nickel is in the above ranges, the charge and discharge capacity tends to become larger.

The second lithium transition metal composite oxide included in each of the second particles may contain cobalt in the composition thereof. In the case where the second lithium transition metal composite oxide included in each of the second particles contains cobalt in the composition thereof, the ratio of the number of moles of cobalt to the total number of moles of the metals other than lithium is, for example, greater than 0 and 0.6 or smaller, is preferably 0.01 or greater and 0.35 or smaller, is more preferably 0.02 or greater and 0.2 or smaller, and is further preferably 0.02 or greater and 0.1 or smaller. The second lithium transition metal composite oxide included in each of the first particles may contain at least one of manganese and aluminum. In the case where the second lithium transition metal composite oxide contains at least one of manganese and aluminum, the ratio of the total number of moles of manganese and aluminum to the total number of moles of the metals other than lithium is, for example, 0 or greater, is preferably greater than 0, is more preferably 0.01 or greater, is further preferably 0.05 or greater, and is especially preferably 0.07 or greater. The ratio of the total number of moles of manganese and aluminum to the total number of moles of the metal elements other than lithium is, for example, 0.6 or smaller, is preferably 0.3 or smaller, is more preferably 0.25 or smaller, is further preferably 0.2 or smaller, and is especially preferably 0.15 or smaller. When the ratio of the total number of moles of manganese and aluminum is in the above ranges, the safety tends to be improved maintaining a good charge and discharge capacity.

The ratio of the number of moles of lithium to the total number of moles of the metals other than lithium in the second lithium transition metal composite oxide included in each of the second particles is, for example, 0.95 or greater, is preferably 1.0 or greater, is more preferably 1.03 or greater, and is further preferably 1.05 or greater. The ratio of the number of moles of lithium to the total number of moles of the metals other than lithium is, for example, 1.5 or smaller, is preferably 1.3 or smaller, is more preferably 1.25 or smaller, and is further preferably 1.2 or smaller. When the ratio of the number of moles of lithium is 0.95 or greater, the output power tends to be improved in a nonaqueous electrolyte secondary battery using the positive electrode active material that includes the second lithium transition metal composite oxide. On the other hand, when the ratio of the number of moles of lithium is 1.5 or smaller, the initial discharge capacity tends to be improved in the case where the positive electrode active material is used in a positive electrode.

The second lithium transition metal composite oxide may contain, in the composition thereof, the element $M^2$ that includes at least one selected from the group consisting of Mg, Ca, Ti, Zr, Nb, Ta, Cr, Mo, W, Fe, Cu, Si, Sn, Bi, Ga, Y, Sm, Er, Ce, Nd, La, Cd, and Lu, and may contain therein the element $M^2$ that includes at least one selected from the group consisting of preferably Zr, Ti, Mg, Ta, Nb, Mo and W.

The ratio of the number of moles of the element $M^2$ to the total number of moles of the metals other than lithium in the second lithium transition metal composite oxide may be, for example, 0 or greater and 0.02 or smaller and may be preferably 0.015 or smaller.

Examples of the second lithium transition metal composite oxide included in each of the second particles, presented as the compositions thereof, include, for example, a lithium transition metal composite oxide represented by Formula (2) below. The second lithium transition metal composite oxide may have a layered structure and may also be the one that has a crystal structure of a hexagonal system.

$$Li_{p2}Ni_{x2}Co_{y2}M^1_{z2}M^2_{w2}O_{\alpha2} \tag{2}$$

p2, x2, y2, z2, w2, and α2 satisfy $0.95 \leq p2 \leq 1.5$, $0.33 \leq x2 < 1$, $0 < y2 \leq 0.6$, $0 \leq z2 \leq 0.6$, $0 \leq w2 \leq 0.02$, $x2+y2+z2+w2=1$, and $1.5 \leq \alpha1 \leq 2.5$. x2, y2, z2, and w2 may satisfy $0.33 \leq x2 < 1$, $0.01 \leq y2 \leq 0.35$, $0 \leq z2 \leq 0.6$, and $0 \leq w2 \leq 0.02$, may satisfy $0.7 \leq x2 < 1$, $0.02 \leq y2 \leq 0.2$, $0.01 \leq z2 \leq 0.25$, and $0 \leq w2 \leq 0.015$, may satisfy $0.7 \leq x2 \leq 0.95$, $0.02 \leq y2 \leq 0.2$, $0.01 \leq z2 \leq 0.25$, and $0 \leq w2 \leq 0.015$, may satisfy $0.8 \leq x2 \leq 0.95$, $0.02 \leq y2 \leq 0.2$, $0.05 \leq z2 \leq 0.2$, and $0 \leq w2 \leq 0.015$, and may satisfy $0.8 \leq x2 \leq 0.95$, $0.02 \leq y2 \leq 0.1$, $0.07 \leq z2 \leq 0.15$, and $0 \leq w2 \leq 0.015$. p2 may satisfy $1.0 \leq p2$, $1.03 \leq p2$, or $1.05 \leq p2$, and may satisfy $p2 \leq 1.3$, $p2 \leq 1.25$, or $p2 \leq 1.2$, and α2 may satisfy $1.8 \leq \alpha2 \leq 2.8$.

$M^1$ may contain at least one of Mn and Al. $M^2$ may include at least one selected from the group consisting of Mg, Ca, Ti, Zr, Nb, Ta, Cr, Mo, W, Fe, Cu, Si, Sn, Bi, Ga, Y, Sm, Er, Ce, Nd, La, Cd, and Lu, and may include at least one selected from the group consisting of Zr, Ti, Mg, Ta, Nb, Mo, and W.

The volume average particle diameter of the second particles is, for example, 1 μm or larger and 10 μm or smaller, is preferably 1.5 μm or larger, is more preferably 2 μm or larger, and is further preferably 3 μm or greater, and is preferably 9 μm or smaller, is more preferably smaller than 8 μm, and is further preferably 7.5 μm or smaller. When the volume average particle diameter of the second particles is in the above ranges, the fillability may be improved in the case where other particles are mixed therewith, and the battery properties may further be improved.

The ratio of the volume average particle diameter of the first particles to the volume average particle diameter of the second particles (the first particles/the second particles) may be, for example, 1.3 or greater and 10 or smaller, may be preferably 1.5 or greater, or 1.6 or greater, and may be preferably 6.7 or smaller, or 2.6 or smaller. When the ratio of the volume average particle diameter is in the above ranges, the move of the lithium ions among the first particles, the second particles, and the third particles tends to further be promoted.

It is preferred that the second particles have a narrow particle size distribution with a single peak. As to the particle size distribution of the second particles, the ratio of the 90%-particle diameter $D_{90}$ to the 10%-particle diameter $D_{10}$ ($D_{90}/D_{10}$) may be, for example, 3.2 or smaller, may be preferably 3 or smaller, 2.6 or smaller, 2.4 or smaller, 2.2 or smaller, or 2.0 or smaller. The lower limit of the ratio of the second particles ($D_{90}/D_{10}$) may be, for example, 1 or greater, 1.4 or greater, or 1.6 or greater. It is preferred that the 90%-particle diameter $D_{90}$ of the second particles be smaller than the 10%-particle diameter $D_{10}$ of the first particles.

The second particles may each include compounds other than the second lithium transition metal composite oxide, such as a compound including sodium and a compound including boron. The content of the compounds other than the second lithium transition metal composite oxide to the second lithium transition metal composite oxide may be 0 ppm or more and 12,000 ppm or less, may be 0 ppm or more and 10,000 ppm or less, may be 0 ppm or more and 8,000 ppm or less, and may be 0 ppm or more and 6,000 ppm or less.

The second particles may each include a compound that includes boron, on the surface thereof. In the case where the second particles each having the compound that includes born as an adhering substance thereto are used in a nonaqueous electrolyte secondary battery, the charge and discharge property and the cycle property tend to be improved.

Examples of the compound that includes boron include lithium metaborate ($LiBO_2$). The compound including boron may form a composite with the second lithium transition metal composite oxide. The content of the compound including boron in the second particles to the second lithium transition metal composite oxide in terms of the boron element may be 0 ppm or more and 2,000 ppm or less, and may be 0 ppm or more and 1,500 ppm or less. The content of the compound including boron in the second particles may be, for example, 0.1% by mole or higher and 2% by mole or lower and is preferably 0.1% by mole or higher and 1.5% by moles or lower as the rate of the number of moles of the boron element to the total number of moles of the metals other than lithium of the second lithium transition metal composite oxide included in the second particles.

The second particles may each include a compound that includes sodium on the surface of the particle. Examples of the compound including sodium include sodium sulfate ($Na_2SO_4$). In the case where the second particles each have a sodium compound on the surface thereof, an effect achieved by the adhering substances such as the compound including boron tends to be more improved. In the case where the second particles each have, for example, the compound including boron as the adhering substance thereto, a better cycle property can be achieved by applying to a nonaqueous electrolyte secondary battery. In the case where the second particles are each a secondary particle formed by aggregated plural primary particles each including the second lithium transition metal composite oxide, it can be considered that sodium is present on the grain boundary of each of the secondary particles each including the second lithium transition metal composite oxide included in each of the second particles, boron can thereby evenly distribute on the overall grain boundary of each of the second particles, and a better cycle property can therefore be acquired.

Third Particles

The third particles each include a third lithium transition metal composite oxide that has a layered structure. The third particles may each be a secondary particle formed by aggregated plural primary particles each including the third lithium transition metal composite oxide.

As to the third lithium transition metal composite oxide included in each of the third particles, the ratio of the number of moles of nickel to the total number of moles of the metals other than lithium in the composition thereof is 0.4 or greater and 0.6 or smaller, is preferably 0.4 or greater and smaller than 0.55, is more preferably 0.4 or greater and 0.5 or smaller, and is further preferably 0.4 or greater and smaller than 0.5. With positive electrode active material particles each including the third lithium transition metal composite oxide whose ratio of the number of moles of nickel is great, the charge and discharge capacity tends to become larger.

The third lithium transition metal composite oxide included in each of the third particles contains cobalt in the composition thereof. The ratio of the number of moles of cobalt to the total number of moles of the metals other than lithium in the composition of the third particle is, for example, 0.35 or greater and 0.55 or smaller, is preferably greater than 0.35 and 0.5 or smaller, and is more preferably 0.4 or greater and 0.5 or smaller. When the ratio of the number of moles of cobalt is in the above ranges, the effect of improving the output power in the low SOC region tends to be improved in the case where the third particles are mixed with the first particles. The third lithium transition metal composite oxide included in each of the third particles may contain at least one of manganese and aluminum. In the case where the third lithium transition metal composite oxide contains at least one of manganese and aluminum, the ratio of the total number of moles of manganese and aluminum to the total number of moles of the metals other than lithium is, for example, greater than 0, is preferably 0.01 or greater, and is more preferably 0.05 or greater. The ratio of the total number of moles of manganese and aluminum to the total number of moles of the metal elements other than lithium is, for example, 0.25 or smaller, is preferably 0.2 or smaller, and is more preferably 0.15 or smaller. When the ratio of the total number of moles of manganese and aluminum is in the above ranges, simultaneous establishment of the charge and discharge capacity and the safety can be achieved.

The ratio of the number of moles of lithium to the total number of moles of the metals other than lithium in the third lithium transition metal composite oxide included in each of the third particles is, for example, 0.95 or greater, is preferably 1.0 or greater, is more preferably 1.03 or greater, and is further preferably 1.05 or greater. The ratio of the number of moles of lithium to the total number of moles of the metals other than lithium is, for example, 1.5 or smaller, is preferably 1.3 or smaller, is more preferably 1.25 or smaller, and is further preferably 1.2 or smaller. When the ratio of the number of moles of lithium is 0.95 or greater, the output power tends to be improved in a nonaqueous electrolyte secondary battery using a positive electrode active material that includes the third lithium transition metal composite oxide. On the other hand, when the ratio of the number of moles of lithium is 1.5 or smaller, the initial discharge capacity tends to be improved in the case where the positive electrode active material is used in a positive electrode.

The third lithium transition metal composite oxide may contain, in the composition thereof, the element $M^2$ that includes at least one selected from the group consisting of Mg, Ca, Ti, Zr, Nb, Ta, Cr, Mo, W, Fe, Cu, Si, Sn, Bi, Ga, Y, Sm, Er, Ce, Nd, La, Cd, and Lu, and may include the element $M^2$ that includes at least one selected from the group consisting of preferably Zr, Ti, Mg, Ta, Nb, Mo, and W.

The ratio of the number of moles of the element $M^2$ to the total number of moles of the metals other than lithium in the third lithium transition metal composite oxide may be, for example, 0 or greater and 0.02 or smaller and may be preferably 0.015 or smaller.

Examples of the third lithium transition metal composite oxide included in each of the third particles, presented as the compositions thereof, include a lithium transition metal composite oxide represented by Formula (3) below. The third lithium transition metal composite oxide may have a layered structure and may also be the one that has a crystal structure of a hexagonal system.

$$Li_{p3}Ni_{x3}Co_{y3}M^1_{z3}M^2_{w3}O_{\alpha 3} \quad (3)$$

p3, x3, y3, z3, w3, and α3 satisfy 0.95≤p3≤1.5, 0.4≤x3≤0.6, 0.35≤y3≤0.55, 0≤z3≤0.25, 0≤w3≤0.02, x3+y3+z3+w3=1, and 1.5≤α3≤2.5. x3, y3, z3, and w3 may satisfy 0.4≤x3≤0.55, 0.35≤y3≤0.5, 0.01≤z3≤0.20, and 0≤w3≤0.015, may satisfy 0.4≤x3<0.55, 0.35<y3≤0.5, 0.01≤z3≤0.20, and 0≤w3≤0.015, may satisfy 0.4≤x3≤0.5, 0.4≤y3≤0.5, 0.05≤z3≤0.15, and 0≤w3≤0.015, and may satisfy 0.4≤x3≤0.5, 0.4≤y3≤0.5, 0.05≤z3≤0.15, and 0≤w3≤0.015. p3 may satisfy 1.0≤p3, 1.03≤p3, or 1.05≤p3, and may satisfy p3≤1.3, p3≤1.25, or p3≤1.2, and α3 may satisfy 1.8≤α3≤2.8.

$M^1$ may include at least one of Mn and Al. $M^2$ may include at least one selected from the group consisting of Mg, Ca, Ti, Zr, Nb, Ta, Cr, Mo, W, Fe, Cu, Si, Sn, Bi, Ga, Y, Sm, Er, Ce, Nd, La, Cd, and Lu, and may include at least one selected from the group consisting of Zr, Ti, Mg, Ta, Nb, Mo, and W.

The volume average particle diameter of the third particles is, for example, 1 μm or larger and 10 μm or smaller, is preferably 1.5 μm or larger, is more preferably 2 μm or larger, and is further preferably 3 μm or larger, and is preferably 9 μm or smaller, is more preferably smaller than 8 μm, and is further preferably 7.5 μm or smaller. It is preferred that the volume average particle diameter of the third particles be smaller than the volume average particle diameter of the first particles. When the volume average particle diameter of the third particles is in the above ranges, the fillability may be improved in the case where other particles are mixed therewith, and the battery properties may further be improved.

The ratio of the volume average particle diameter of the first particles to the volume average particle diameter of the third particles (the first particles/the third particles) may be, for example, 1.3 or greater and 20 or smaller, may be preferably 1.5 or greater, or 1.6 or greater, and may be preferably 6.7 or smaller, or 3.6 or smaller. The ratio of the volume average particle diameter of the second particles to the volume average particle diameter of the third particles (the second particles/the third particles) may be, for example, 0.5 or greater and 5.0 or smaller, may be preferably 0.7 or greater, or 1.0 or greater, and may be preferably 3.5 or smaller, or 2.0 or smaller. When the ratios of the volume average particle diameter are in the above ranges, the move of the lithium ions among the first particles, the second particles, and the third particles tends to further be promoted.

It is preferred that the third particles have a particle size distribution with a single peak. As to the particle size distribution of the third particles, the ratio of the 90%-particle diameter $D_{90}$ to the 10%-particle diameter $D_{10}$ ($D_{90}/D_{10}$) may be, for example, 4.2 or smaller, may be preferably 4 or smaller, or 3.7 or smaller. The lower limit of the ratio of the third particles ($D_{90}/D_{10}$) may be, for example, 1 or greater, 2 or greater, 2.8 or greater, or 3 or greater.

The third particles may each include compounds other than the third lithium transition metal composite oxide, such as a compound including sodium and a compound including boron. The content of the compounds other than the third lithium transition metal composite oxide to the third lithium transition metal composite oxide may be 0 ppm or more and 12,000 ppm or less, may be 0 ppm or more and 10,000 ppm or less, may be 0 ppm or more and 8,000 ppm or less, and may be 0 ppm or more and 6,000 ppm or less.

Positive Electrode for Nonaqueous Electrolyte Secondary Battery

A positive electrode for a nonaqueous electrolyte secondary battery (hereinafter, also referred to as "positive electrode") includes a current collector and a positive electrode active material layer that is disposed on the current collector and that includes the above described positive electrode active material. A nonaqueous electrolyte secondary battery including the above positive electrode may be established as the one whose charge and discharge capacity and whose output power property in the low SOC region are improved.

Examples of the material of the current collector include, for example, aluminum, nickel, and stainless steel. The positive electrode active material layer may be formed by applying, to the current collector, a positive electrode composition that is obtained by mixing the positive electrode active material, a conductive agent, a binder, and the like with each other together with a solvent, and conducting a drying process, a pressurizing process, and the like. Examples of the conductive agent include carbon materials such as natural graphite, artificial graphite, acetylene black, ketjen black (KB), vapor grown carbon fiber (VGCF), carbon nanotubes (CNT), and carbon nanofiber (CNF), and the like. Examples of the binder include, for example, polyvinylidene fluoride, polytetrafluoroethylene, butylene rubber, styrenebutadiene rubber, and polyamideacrylic resin. Examples of the solvent include N-methyl-2-pyrrolidone (NMP), and the like. The positive electrode may further include a thickener in the positive electrode active material layer thereof. The members of each of the configurations have been exemplified while, only when the positive electrode for a nonaqueous electrolyte secondary battery of the present disclosure includes the positive electrode active material, the other configurations thereof are not especially limited.

Nonaqueous Electrolyte Secondary Battery

A nonaqueous electrolyte secondary battery includes the above positive electrode for a nonaqueous electrolyte secondary battery. In addition to the positive electrode for a nonaqueous electrolyte secondary battery, the nonaqueous electrolyte secondary battery may include a negative electrode for a nonaqueous electrolyte secondary battery, a nonaqueous electrolyte, a separator, and the like. As the negative electrode for a nonaqueous electrolyte secondary battery, the nonaqueous electrolyte, the separator, and the like in the nonaqueous electrolyte secondary battery, those for a nonaqueous electrolyte secondary battery described in, for example, Japanese Laid-Open Patent Publication No. 2002-075367, Japanese Laid-Open Patent Publication No. 2011-146390, and Japanese Laid-Open Patent Publication No. 2006-12433 (that are incorporated herein by reference in their entirety) are usable as necessary. The nonaqueous electrolyte secondary battery of the present disclosure is not limited to the one that uses a liquid electrolyte and includes an all-solid lithium battery that uses a solid electrolyte. For the configurations in an all-solid lithium battery, for example, those for an all-solid lithium battery described in Japanese Laid-Open Patent Publication No. 2017-016794 are usable as necessary. Only when the nonaqueous electrolyte secondary battery of the present disclosure includes the above positive electrode active material, other configurations thereof are not especially limited.

EXAMPLES

Example 1

Providing Positive Electrode Active Material $Li_{1.05}Ni_{0.81}Co_{0.05}Mn_{0.12}Al_{0.02}O_2$ (volume average particle diameter: 9.8 μm) having, on the surface thereof, a compound including boron at 1,000 ppm as the first particles, $Li_{1.05}Ni_{0.81}Co_{0.05}Mn_{0.12}Al_{0.02}O_2$ (volume average particle diameter: 4.4 μm) having, on the surface thereof, a compound including boron at 1,100 ppm as the second particles, and third particles A that were $Li_{1.07}Ni_{0.45}Co_{0.45}Mn_{0.10}O_2$ (volume average particle diameter: 3.9 μm) as the third particles were provided. The first particles, the second particles, and the third particles were mixed with each other at 80:17.5:2.5 (mass ratios) to provide a positive electrode active material.

Figure 3A:
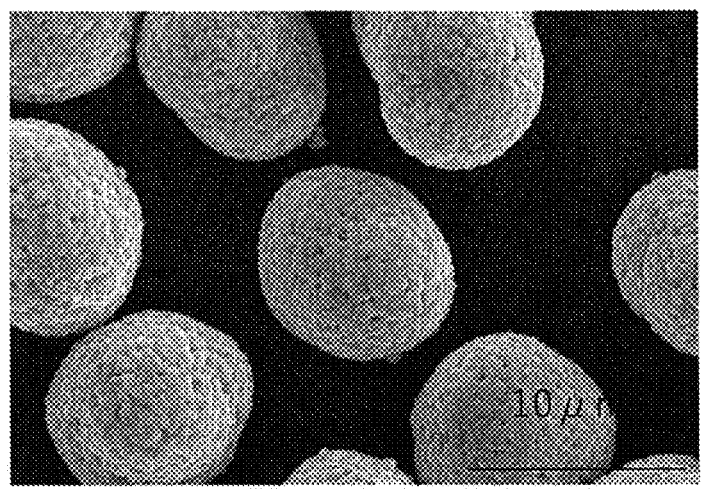
FIG. 3A shows an exemplary scanning electron microscope (SEM) image of the first particles according to Example 1.
Figure 3B:
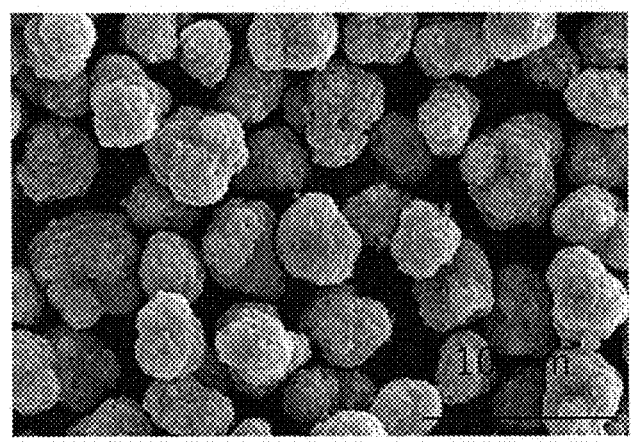
FIG. 3B shows an exemplary scanning electron microscope (SEM) image of the second particles according to Example 1.
Figure 3C:
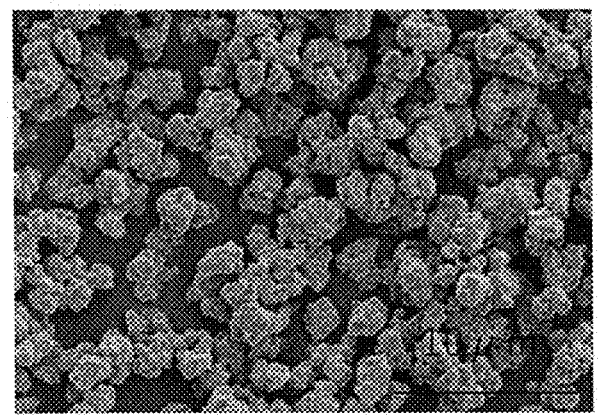
FIG. 3C shows an exemplary scanning electron microscope (SEM) image of the third particles according to Example 1.
Figure 3D:
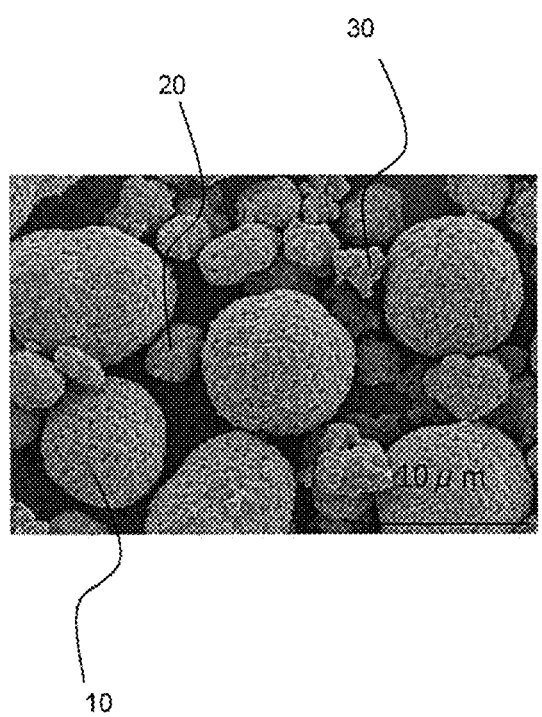
FIG. 3D shows an exemplary scanning electron microscope (SEM) image of the positive electrode active material according to Example 1.

The first particles, the second particles, the third particles, and the positive electrode active material of Example 1 were observed using a scanning electron microscope (Hitachi High-Tech Corporation, SU8230) at an acceleration voltage of 1.5 kV, to acquire scanning electron microscope (SEM) images. FIG. 3A to FIG. 3D depict the result thereof. FIG. 3A is an SEM image of the first particles. FIG. 3B is an SEM image of the second particles. FIG. 3C is an SEM image of the third particles. FIG. 3D is an SEM image of the positive electrode active material. As depicted in FIG. 3D, the first particles 10, the second particles 20, and the third particles 30 are present being mixed with each other in the positive electrode active material.

Example 2

A positive electrode active material was provided in the same manner as that of Example 1 except the fact that the first particles, the second particles, and the third particles were mixed with each other at 80:16.5:3.5 (mass ratios).

Example 3

A positive electrode active material was provided in the same manner as that of Example 1 except the fact that the first particles, the second particles, and the third particles were mixed with each other at 80:15:5 (mass ratios).

Example 4

A positive electrode active material was provided in the same manner as that of Example 1 except the fact that the first particles, the second particles, and the third particles were mixed with each other at 80:10:10 (mass ratios).

Example 5

A positive electrode active material was provided in the same manner as that of Example 1 except for providing third particles B that were $Li_{1.07}Ni_{0.55}Co_{0.35}Mn_{0.10}O_2$ (volume average particle diameter: 4.4 μm) as the third particles.

Comparative Example 1

A positive electrode active material was provided in the same manner as that of Example 1 except for mixing only the first particles and the second particles with each other at the first particles:the second particles=80:20 (mass ratios).

Comparative Example 2

A positive electrode active material was provided in the same manner as that of Example 1 except for mixing only the first particles and the third particles with each other at 80:20 (mass ratios).

Comparative Example 3

A positive electrode active material was provided in the same manner as that of Example 1 except for mixing only the first particles and the third particles with each other at 95:5 (mass ratios).

The particle size distribution was measured for each of the first particles, the second particles, and the third particles that were used in the above. Table 1 shows the result thereof.

TABLE 1

|  | $D_{10}$ (μm) | $D_{50}$ (μm) | $D_{90}$ (μm) | $D_{90}/D_{10}$ |
|---|---|---|---|---|
| First particles | 8.1 | 9.8 | 11.8 | 1.46 |
| Second particles | 3.2 | 4.4 | 6.1 | 1.91 |
| Third particles A | 2.1 | 3.9 | 7.6 | 3.54 |
| Third particles B | 2.3 | 4.4 | 7.4 | 3.15 |

(Measurement of DC Internal Resistance in Low SOC Region)

For the positive electrode active material of each of Examples and Comparative Examples, evaluation of the output power property was conducted by measuring the DC internal resistance (DC-IR) thereof. The measurement was conducted as below.

Production of Positive Electrode 92 parts by mass of the positive electrode active material, 3 parts by mass of acetylene black, and 5 parts by mass of polyvinylidene fluoride (PVDF) were dispersed in N-methyl-2-pyrrolidone (NMP) and were resolved to prepare a positive electrode slurry. The obtained positive electrode slurry was applied to a current collector formed of an aluminum foil, was dried, was thereafter compression-molded using a roll press machine for the density of the positive electrode active material layer to become 3.3 g/cm$^3$, and was cut for the size thereof to become 15 cm$^2$ to obtain a positive electrode.

Production of Negative Electrode 97.5 parts by mass of artificial graphite, 1.5 parts by mass of carboxymethylcellulose (CMC), and 1.0 part by mass of styrenebutadiene rubber (SBR) were dispersed in water to prepare a negative electrode slurry. The obtained negative electrode slurry was applied to a copper foil, was dried, and was further compression-molded to obtain a negative electrode.

Production of Nonaqueous Electrolytic Solution

Ethylene carbonate (EC) and ethylmethyl carbonate (EMC) were mixed with each other at volume ratios of 3:7 to be a mixed solvent. Lithium hexafluorophosphate (LiPF$_6$) was resolved in the obtained mixed solvent for the concentration thereof to be 1 mol/L to obtain a nonaqueous electrolytic solution.

Production of Battery for Evaluation

A lead electrode was attached to each of the current collectors of the positive electrode and the negative electrode, and vacuum drying was thereafter conducted at 120° C. A separator was disposed between the positive electrode and the negative electrode, and these members were accommodated in a bag-like laminated pack. This pack was vacuum-dried at 60° C. to remove the moisture adsorbed be the members. The nonaqueous electrolytic solution was thereafter injected into the laminated pack in an argon atmosphere and the laminated pack was sealed to produce a battery for evaluation.

Aging

For the battery for evaluation, constant-voltage and constant-current charging (with a cut-off current of 0.005 C) at a charging voltage of 4.2 V and with a charging current of 0.1 C (1 C is a current with which discharging is finished in 1 hour) and constant-current discharging with a discharging end voltage of 2.5 V and with a discharging current of 0.1 C were conducted to cause the positive electrode and the negative electrode to acquire affinity with the nonaqueous electrolytic solution.

Measurement of DC Internal Resistance

The battery for evaluation after the aging was placed in an environment of 25° C. and measurement of the DC internal resistance (DC-IR) was executed therefor. Constant-current charging was conducted to SOC 95% at the full charging voltage of 4.2 V and the open circuit voltage at SOC 95% was thereafter measured. Thereafter, pulse discharging by a specific current i was conducted for 10 seconds to measure the voltage V acquired 10 seconds thereafter. The DC internal resistance was calculated using the difference between the open circuit voltage and the voltage V acquired 10 seconds thereafter. The current i was set to be i=0.08 A. The constant-current discharging was conducted using this to SOC 80%, 50%, 20%, 10%, and 5%, and the DC internal resistance measurement was repeated for these.

(Measurement of Discharge Capacity)

The discharge capacity was evaluated as below for the positive electrode active material of each of Examples and Comparative Examples.

A battery for evaluation similar to the one used in the measurement of the DC internal resistance was produced, and aging was similarly conducted using the produced battery for evaluation. After the aging, constant-voltage and constant-current charging was conducted (with a cut-off current of 0.005 C) at a charging voltage of 4.2 V and with a charging current of 0.1 C and thereafter constant-current discharging with a discharging end voltage of 2.5 V and with a discharging current of 0.1 C was conducted to measure the discharge capacity.

Table 2 shows the relative resistance value and the relative discharge capacity at SOC 5% in each of Examples and Comparative Examples obtained when the relative resistance value was set to be 1 and the value of the discharge capacity was set to be 1 at SOC 5% in Comparative Example 1.

TABLE 2

|  | Content of first particles (%) | Content of second particles (%) | Content of third particles (%) | Composition of third particles (Ni/Co/Mn) | Relative resistance in low SOC region | Relative discharge capacity |
| --- | --- | --- | --- | --- | --- | --- |
| Example 1 | 80 | 17.5 | 2.5 | 45/45/10 | 0.68 | 0.993 |
| Example 2 | 80 | 16.5 | 3.5 | 45/45/10 | 0.56 | 0.993 |
| Example 3 | 80 | 15 | 5 | 45/45/10 | 0.54 | 0.990 |
| Example 4 | 80 | 10 | 10 | 45/45/10 | 0.49 | 0.978 |
| Example 5 | 80 | 17.5 | 2.5 | 55/35/10 | 0.87 | 0.994 |
| Comparaitve Example 1 | 80 | 20 | 0 | 45/45/10 | 1.00 | 1.000 |
| Comparaitve Example 2 | 80 | 0 | 20 | 45/45/10 | 0.48 | 0.955 |
| Comparaitve Example 3 | 95 | 0 | 5 | 45/45/10 | 0.67 | 0.984 |

Figure 2:
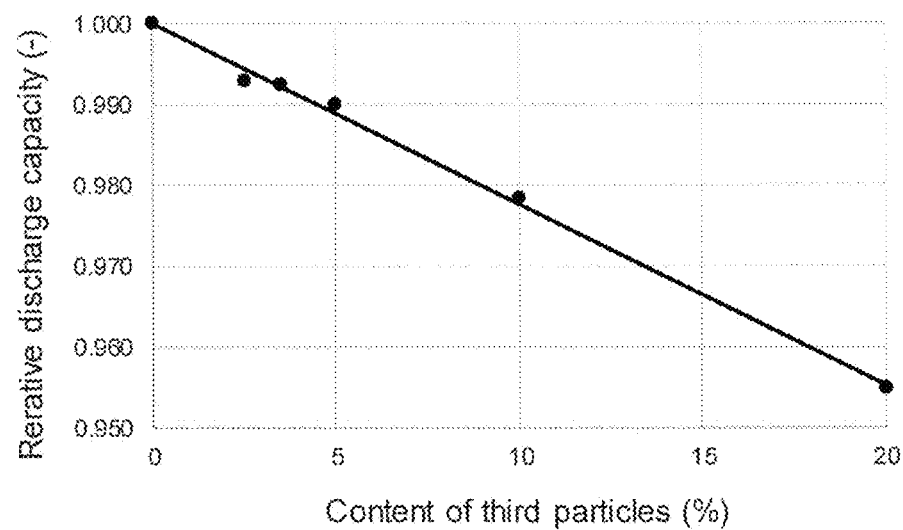
FIG. 2 is a diagram plotting the result of measurement of a discharge capacity of each of Examples and Comparative Examples.

Based on Table 2, FIG. 1 depicts plots of the relative resistance and FIG. 2 depicts the relative discharge capacity, in the low SOC region of Example 1 to Example 4, and Comparative Example 1 and Comparative Example 2 against the content of the third particles.

From the results in Table 2 and FIG. 1, it can be seen that the output power in the low SOC region of Example 3 was further improved suppressing the reduction of the discharge capacity compared to those of Comparative Example 3. It can be considered that this was because of the influence by the presence of the second particles whose volume average particle diameter was smaller than that of the first particles. It can be seen that, in Examples that each included the first particles, the second particles, and the third particles, the reduction of the discharge capacity was suppressed improving the output power in the low SOC region. As to Examples, the discharge capacity tended to be almost linearly reduced associated with the increase of the content of the third particles. On the other hand, for the resistance in the low SOC region, in a region where the content of the third particles was low, the degree of improvement to the content tended to be high, and the degree of improvement to the content tended to be low as the content of the third particles became high. From this, it can be seen that the effect of improving the output power in the low SOC region and the effect of suppressing the reduction of the discharge capacity was able to be more strongly achieved by including the first particles, the second particles, and the third particles, and concurrently setting the amount of the third particles to be a specific amount or less.

The disclosure of Japanese Laid-Open Patent Publication No. 2020-141364 (Date of Application: Aug. 25, 2020) is incorporated herein by reference in its entirety. All of the literatures, the patent applications, and the technical standards described herein are incorporated herein by reference to the same extent of the case where it is specifically and individually described that each of those literatures, patent applications, and technical standards is incorporated herein by reference.

What is claimed is:

1. A positive electrode active material comprising:
   first particles that each consist of a first lithium transition metal composite oxide, the first lithium transition metal composite oxide having a layered structure and having a ratio of a number of moles of nickel to a total number of moles of metals other than lithium in a composition thereof being 0.7 or greater and smaller than 1;
   second particles that have a volume average particle diameter smaller than a volume average particle diameter of the first particles, the second particles each consisting of a second lithium transition metal composite oxide having a layered structure; and
   third particles that each consist of a third lithium transition metal composite oxide, the third lithium transition metal composite oxide having a layered structure, having a ratio of a number of moles of nickel to a total number of moles of metals other than lithium in a composition of the third particles being 0.4 or greater and 0.6 or smaller, and having a ratio of a number of moles of cobalt to the total number of moles being 0.35 or greater and 0.55 or smaller, wherein
   a content of the first particles is 60% by mass or higher and lower than 100% by mass to a total content of the first particles, the second particles, and the third particles, and
   a content of the third particles is higher than 0% and 10% by mass or lower to the total content of the first particles, the second particles, and the third particles, wherein the second particles consist of the second lithium transition metal composite oxide having a composition that has a ratio of a number of moles of nickel to a total number of moles of metals other than lithium being 0.33 or greater and smaller than 1, and a ratio of a number of moles of cobalt to the total number of moles being 0.01 or greater and 0.35 or smaller.

2. The positive electrode active material according to claim 1, wherein the content of the third particles is higher than 0% and 8% by mass or lower to the total content of the first particles, the second particles, and the third particles.

3. The positive electrode active material according to claim 2, wherein
   the content of the first particles is 70% by mass or higher and 90% by mass or lower to the total content of the first particles, the second particles, and the third particles, and
   a content of the second particles is 1% by mass or higher and lower than 30% by mass to the total content of the first particles, the second particles, and the third particles.

4. The positive electrode active material according to claim 3, wherein the third particles have a volume average particle diameter that is smaller than the volume average particle diameter of the first particles.

5. The positive electrode active material according to claim 4, wherein
   the volume average particle diameter of the first particles is 8 μm or larger and 20 μm or smaller,
   the volume average particle diameter of the second particles is 2 μm or larger and smaller than 8 μm, and
   the volume average particle diameter of the third particles is 2 μm or larger and smaller than 8 μm.

6. The positive electrode active material according to claim 5, wherein
   a ratio of the volume average particle diameter of the first particles to the volume average particle diameter of the second particles is 1.3 or greater and 10 or smaller.

7. The positive electrode active material according to claim 6, wherein
   the second particles each consist of a second lithium transition metal composite oxide having a composition that has a ratio of a number of moles of nickel to a total number of moles of metals other than lithium being 0.7 or greater and smaller than 1.

8. The positive electrode active material according to claim 1, wherein
   the content of the first particles is 70% by mass or higher and 90% by mass or lower to the total content of the first particles, the second particles, and the third particles, and
   a content of the second particles is 1% by mass or higher and lower than 30% by mass to the total content of the first particles, the second particles, and the third particles.

9. The positive electrode active material according to claim 1, wherein
   the third particles have a volume average particle diameter that is smaller than the volume average particle diameter of the first particles.

10. The positive electrode active material according to claim 1, wherein
    the volume average particle diameter of the first particles is 6 μm or larger and 30 μm or smaller,
    the volume average particle diameter of the second particles is 1 μm or larger and 10μm or smaller, and
    the volume average particle diameter of the third particles is 1 μm or larger and 10 μm or smaller.

11. The positive electrode active material according to claim 1, wherein
    the volume average particle diameter of the first particles is 8 μm or larger and 20 μm or smaller,
    the volume average particle diameter of the second particles is 2 μm or larger and smaller than 8 μm, and
    the volume average particle diameter of the third particles is 2 μm or larger and smaller than 8 μm.

12. The positive electrode active material according to claim 1, wherein
a ratio of the volume average particle diameter of the first particles to the volume average particle diameter of the second particles is 1.3 or greater and 10 or smaller.

13. The positive electrode active material according to claim 1, wherein
the second particles each consist of a second lithium transition metal composite oxide having a composition that has a ratio of a number of moles of nickel to a total number of moles of metals other than lithium being 0.7 or greater and smaller than 1.

14. The positive electrode active material according to claim 4, wherein
the first lithium transition metal composite oxide has a composition represented by Formula (1) below, $$Li_{p1}Ni_{x1}Co_{y1}M^1_{z1}M^2_{w1}O_{\alpha 1} \quad (1)$$

and wherein
p1, x1, y1, z1, w1, and α1 satisfy $0.95 \leq p1 \leq 1.5$, $0.7 \leq x1 < 1$, $0 < y1 \leq 0.3$, $0 \leq z1 \leq 0.3$, $0 \leq w1 \leq 0.02$, $x1+y1+z1+w1=1$, and $1.5 \leq \alpha 1 \leq 2.5$,
where
$M^1$ represents at least one of Mn and Al, and
$M^2$ represents at least one selected from the group consisting of Ca, Zr, Ti, Mg, Ta, Nb, Cr, Mo, W, Fe, Cu, Si, Sn, Bi, Ga, Y, Sm, Er, Ce, Nd, La, Cd, and Lu.

15. The positive electrode active material according to claim 1, wherein
the second lithium transition metal composite oxide has a composition represented by Formula (2) below, $$Li_{p2}Ni_{x2}Co_{y2}M^1_{z2}M^2_{w2}O_{\alpha 2} \quad (2)$$

and wherein
p2, x2, y2, z2, w2, and α2 satisfy $0.95 \leq p2 \leq 1.5$, $0.33 \leq x2 < 1$, $0.01 \leq y2 \leq 0.35$, $0 \leq z2 \leq 0.6$, $0 \leq w2 \leq 0.02$, $x2+y2+z2+w2=1$, and $1.5 \leq \alpha 2 \leq 2.5$, where
$M^1$ represents at least one of Mn and Al, and
$M^2$ represents at least one selected from the group consisting of Ca, Zr, Ti, Mg, Ta, Nb, Cr, Mo, W, Fe, Cu, Si, Sn, Bi, Ga, Y, Sm, Er, Ce, Nd, La, Cd, and Lu.

16. The positive electrode active material according to claim 1, wherein
the third lithium transition metal composite oxide has a composition represented by Formula (3) below, $$Li_{p3}Ni_{x3}Co_{y3}M^1_{z3}M^2_{w3}O_{\alpha 3} \quad (3)$$

and wherein
p3, x3, y3, z3, w3, and α3 satisfy $0.95 \leq p3 \leq 1.5$, $0.4 \leq x3 \leq 0.6$, $0.35 \leq y3 \leq 0.55$, $0 \leq z3 \leq 0.25$, $0 \leq w3 \leq 0.02$, $x3+y3+z3+w3=1$, and $1.5 \leq \alpha 3 \leq 2.5$, where
$M^1$ represents at least one of Mn and Al, and
$M^2$ represents at least one selected from the group consisting of Ca, Zr, Ti, Mg, Ta, Nb, Cr, Mo, W, Fe, Cu, Si, Sn, Bi, Ga, Y, Sm, Er, Ce, Nd, La, Cd, and Lu.

17. A positive electrode for a nonaqueous electrolyte secondary battery, the positive electrode comprising the positive electrode active material according to claim 1.

* * * * *